United States Patent [19]
Balzer

[11] 3,967,076
[45] June 29, 1976

[54] CALL DENIAL CIRCUIT FOR KEY TELEPHONE SYSTEMS

[75] Inventor: Gerry Christian Balzer, Freehold, N.J.

[73] Assignee: Bell Telephone Laboratories, Incorporated, Murray Hill, N.J.

[22] Filed: Mar. 27, 1975

[21] Appl. No.: 562,573

[52] U.S. Cl. .............................. 179/99; 179/18 DA
[51] Int. Cl.² ........................................... H04M 1/66
[58] Field of Search ........... 179/18 D, 18 DA, 81 R, 179/86, 99, 27 CB, 18 F, 18 FA

[56] References Cited
UNITED STATES PATENTS

| | | | |
|---|---|---|---|
| 3,553,382 | 1/1971 | Knox et al. .................... | 179/18 DA |
| 3,821,485 | 6/1974 | Harrington et al. ............ | 179/18 DA |
| 3,860,762 | 1/1975 | Klaiber et al. ................. | 179/18 DA |
| 3,902,024 | 8/1975 | Hijikata et al. ................ | 179/99 |

*Primary Examiner*—Kathleen H. Claff
*Assistant Examiner*—Randall P. Myers
*Attorney, Agent, or Firm*—David H. Tannenbaum

[57] ABSTRACT

A call denial circuit for use in a key telephone system is arranged to operate in response to a communication line reversal from the central office to create a timed interval during which the A leads from the associated key stations are observed. If any station having unrestricted capability is off-hook and active during the timed interval, the call denial circuit is inhibited and the call proceeds in the normal manner. At the expiration of the timed interval the call may continue even though only restricted stations remain on the established connection. The circuit is arranged so that a station may have some lines which are restricted and some lines which are unrestricted.

13 Claims, 1 Drawing Figure

U.S. Patent  June 29, 1976  3,967,076
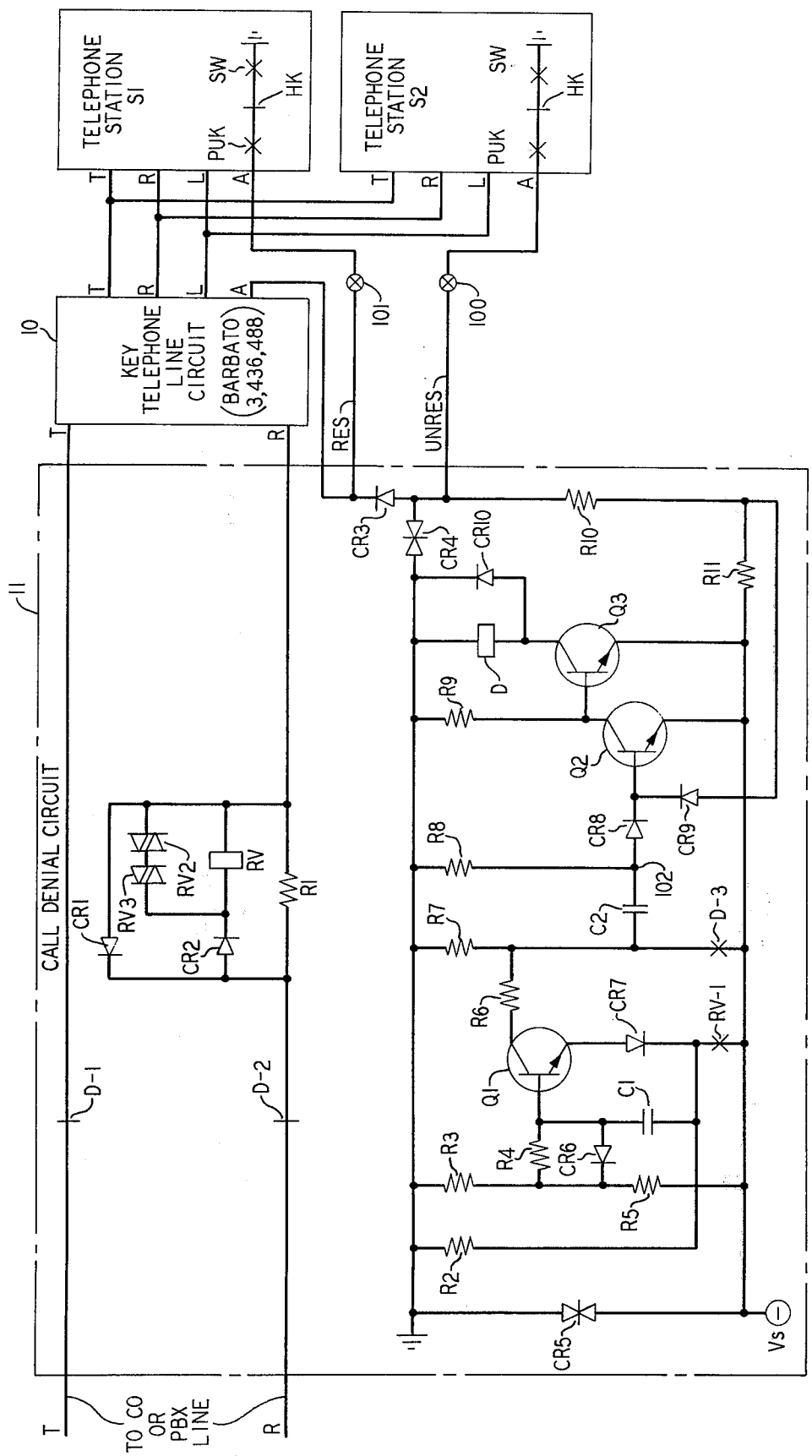

CALL DENIAL CIRCUIT FOR KEY TELEPHONE SYSTEMS

FIELD OF THE INVENTION

This invention relates to a call denial circuit for use in conjunction with a key telephone system and, more particularly, to a call denial circuit operable in response to communication line reversals.

BACKGROUND OF THE INVENTION

It is known in the art to provide a circuit for denying calling connections when a telephone station user dials digits representative of unauthorized station or area codes. A problem exists, however, when several stations are connectable to the same communication line and where it is desired that some of the stations have unrestricted calling capability. An example of such an arrangement is a key telephone system, such as the key telephone system disclosed in U.S. Pat. No. 3,436,488 issued to R. E. Barbato and D. T. Davis on Apr. 1, 1969.

In such a key telelphone system it is customary to have each line from the central office (CO) or PBX connectable to more than one key telephone station. In many such systems the telephone users at the different stations are given different dialing capabilities and, thus, merely detecting an improperly dialed code and denying the continuation of the call would result in the denying of calling connections to those who are permitted to place unrestricted calls.

A further problem results in situations where, as a result of a call being placed to a restricted area, the CO line polarity or PBX line polarity is reversed for the duration of the call. Under this situation, a call may be placed by a station having unrestricted call establishing authority and thereafter it may become desirable to have the calling connection maintained only from a station having restricted authority. Since the telephone line polarity has been reversed, any circuit which simply monitors such a reversal would operate to cut off the connection when the unrestricted station is no longer associated with the call. This is an undesirable situation.

Accordingly, a need exists in the art for a call denial circuit operable with multistation systems wherein those stations with unlimited calling authority may use the same CO line or PBX line as is used by a station having restricted dialing authority.

A further need exists in the art for such a call denial circuit wherein the assignment of restricted and nonrestricted capability to the associated stations can be easily and economically facilitated.

A further need exists in the art for a key telephone call denial circuit in which all calling connections, once established, can be maintained by restricted as well as unrestricted stations.

SUMMARY OF THE INVENTION

The foregoing needs of the prior art are met in an illustrative embodiment of my invention in which a call denial circuit operates in response to a polarity reversal of the CO or PBX network when a restricted call is dialed. Advantage is taken of the fact that when a restricted call is dialed, the communication leads from the central switching machine, such as a CO or PBX, are reversed as to polarity. The call denial circuit monitors both the communication leads and the A leads from the stations and serves to deny calls when there are no stations currently active having unrestricted dialing capability. The call denial circuit is arranged for insertion between the CO or PBX lines and the key telephone line circuit. Two output terminals are provided; one such terminal for connection to the A leads from designated restricted stations and the other such terminal for connection to the A leads from designated unrestricted stations.

In response to a detected polarity reversal, the call denial circuit creates a timed interval during which the A leads from the associated stations are observed. If any station having unrestricted capability is off-hook and active, as determined by the presence of a signal on the A lead during the timed interval, the call denial circuit is inhibited and the call proceeds in the normal manner. At the expiration of the timed interval, the call may continue even though only restricted stations remain active on the established connection. If during the established time interval after a detected polarity reversal only restricted stations are active, the call denial circuit operates to inhibit further communications over the CO or PBX line.

BRIEF DESCRIPTION OF THE DRAWING

The operation of my invention can be easily understood from the illustrative embodiment shown in the one FIGURE drawing where the call denial circuit is shown.

DETAILED DESCRIPTION

Turning now to the FIGURE, let us assume that telephone station S2 has been arbitrarily designated as a station capable of establishing telephone connections on an unrestricted basis while telephone station S1 may only establish connections to certain restricted telephone calling areas. Accordingly, as shown in the FIGURE, station S1 is connected to terminal 101 from call denial circuit 11 and station S2 is connected to terminal 100 from call denial circuit 11. As will be seen from that which is to follow, it is a simple matter to designate any station as a restricted or an unrestricted telephone station by merely connecting its A lead to either terminal 101 or terminal 100. Of course, it will be obvious that one or more stations can be connected to either terminal 100 or terminal 101, dependent only upon the number of stations served by key telephone circuit 10.

Prior to beginning a discussion of the operation of call denial circuit 11, it would seem worth while to review briefly the operation of a key telephone system and particularly the operation of key telephone line circuit 10, which line circuit can be advantageously arranged as shown in the Barbato et al patent referred to hereinbefore. In such an arrangement, when a telephone station, such as telephone station S1, goes off-hook, its network (which includes the speech transducing network and the dialing network, not shown) is connected across the T and R leads to key telephone line circuit 10. When telephone station S1 goes off-hook, a ground is also provided over the A lead, which ground is extended directly to key telephone line circuit 10. Apparatus (not shown) in key telephone line circuit 10 operates in response to ground on the A lead and current flowing from the central switching machine, such as a CO or PBX, to establish a connection from telephone station S1 to the CO or PBX over the T and R leads. Lamp signals indicating the status of the connection are extended from key telephone line circuit 10 over the L lead to the associated telephone stations. For a more detailed discussion of the above-described operation, reference should be made to the Barbato et al patent.

When the off-hook telephone station desires to establish a communication connection to a particular other station, the telephone directory number associated with the desired called station is transmitted over the T and R leads from the telephone station as either a series of dial pulses or as a combination of frequencies representative of each dialed digit. These dialed digits are passed through key telephone line circuit 10 and over the T and R leads to the CO or PBX switching machine. For purposes of discussion herein, it will be assumed that the CO or PBX is arranged in a manner such that the voltage potential on the T and R leads extending therefrom is reversed any time there is dialed a calling connection having digits representative of certain restricted stations or areas. The manner in which such communication lead voltage potential reversal is accomplished is well known in the art.

Under a normal connection the R lead from the CO or PBX has negative potential thereon while the T lead has positive potential thereon. The CO or PBX switching machine, upon detecting the dialing of a restricted calling code reverses the voltage potential on the T and R leads so that negative potential is extended over the T lead and positive potential is extended over the R lead. Under certain conditions, this polarity reversal will only occur for a relatively short interval while in other situations the voltage potential will remain reversed for the duration of the calling connection. Both of these situations will be discussed in more detail hereinafter.

Establishment of an Outgoing Communication Connection

When either telephone station S1 or telephone station S2 goes off-hook, a connection is established through key telephone line circuit 10 and through call denial circuit 11 over the T and R leads to the CO or PBX. Since, as discussed above, negative potential is on the R lead, that potential is extended via released break contact D-2 and forward-biased diode CR1 and over the R lead through key telephone line circuit 10, and through the telephone station network (not shown) and back over the T lead and through break contact D-1 of call denial circuit 11 to positive potential. Since diode CR1 is forward-biased and diode CR2 is reverse-biased, relay RV remains unoperated and the outgoing connection is established in a straightforward manner under control of the dialed digits from telephone station S1 or telephone station S2.

If the call is directed to a station or an area which is unrestricted, the call will proceed in a well-known manner. However, if the dialing code is one that has been designated as a restricted dialing code, the CO or PBX, as discussed above, operates to reverse polarity on the communication leads. Accordingly, diode CR1 becomes back-biased while diode CR2 becomes forward-biased, thereby causing current to flow through the winding of relay RV, which relay operates under control of the communication lead voltage reversal. It should be noted that varistors RV2 and RV3 limit the voltage drop across the coil of relay RV to protect against current surges. The low ac impedance of the varistors shunting the coil is desirable to reduce transmission loss. Resistor R1 sets a lower allowable threshold of line current required to operate relay RV. Accordingly, the current through resistor R1 must be sufficient to cause a voltage drop in excess of the internal voltage drop of diode CR2 before the diode will conduct substantial current. In addition, diodes CR5 and CR4 are symmetrical surge protector diodes intended to protect the circuit from voltage surges on the power supply and A leads.

The operation of relay RV serves to extend negative potential via now enabled make contact RV-1 to the emitter of transistor Q1, which transistor is off prior to the operation of relay RV. Capacitor C1, in conjunction with resistors R3, R4 and R5, serves to provide an approximately 50-millisecond time delay to insure that relay RV is operating on a valid battery reversal and not from random voltage potentials or from ringing voltages on the line. In the idle state, with make contact RV-1 open, capacitor C1 is charged to one-half of the supply voltage (Vs) by means of resistor R2 to ground and resistor R4 to the voltage divider consisting of equal resistors R3 and R5. The side of capacitor C1 which is connected to diode CR6 is therefore negative by Vs/2 with respect to the other side of capacitor C1. When make contact RV-1 closes, the potential at the junction of capacitor C1 and resistor R2 is changed from ground to the negative supply voltage. This negative transition is coupled through capacitor C1 and reverse-biases the base of transistor Q1, which transistor remains off. Current flowing through resistor R4 charges capacitor C1 toward Vs/2 until the voltage on the base of transistor Q1 rises sufficiently to turn on that transistor thereby terminating the timing interval. When make contact RV-1 opens, capacitor C1 discharges through resistor R2, diode CR6 and the voltage divider. Diode CR6 shunts resistor R4 in order to reduce the resistance in the discharge path and thereby decrease the reset time. This insures that the circuit will not respond to a train of short pulses of reverse polarity current on the CO or PBX line, such as occurs with ringing.

If relay RV remains operated for greater than approximately 50 milliseconds, the base drive is supplied to transistor Q1, which transistor turns on, thereby providing negative potential via resistor R6 and capacitor C2 to point 102, which point had been at a voltage potential slightly positive with respect to negative battery, thereby serving to maintain transistor Q2 on via base drive supplied through diode CR8. Transistor Q2 being on, in turn, provides negative potential to the base of transistor Q3, thereby maintaining transistor Q3 off.

When negative potential is applied via capacitor C2 to point 102 as a result of transistor Q1 turning on, diode CR8 becomes reverse-biased and the base drive of transistor Q2 is removed so that transistor is free to turn off. If transistor Q2 turns off at this time, transistor Q3 will turn on from base drive supplied through resistor R9. Under such a condition, relay D would operate, opening the T and R communication leads via then enabled break contacts D-1 and D-2 and the call will be denied. Thus, if relay D operates, the call denial circuit functions to inhibit communication connections upon the reversal of the communication leads.

Returning now to transistor Q2, it will be seen that, although transistor Q1 turning on served to remove the base drive supplied via diode CR8, an alternate base drive circuit exists via diode CR9 and resistor R10 from terminal 100. Thus, if any telephone station, such as telephone station S2, has its A lead connected to terminal 100 (the unrestricted terminal) and such a connected station is off-hook and active, ground potential would be supplied via the enabled switchhook contact SW, the released hold contact HK and the enabled pickup key contact PUK. This ground potential on terminal 100 serves to provide base drive to transistor Q2, thereby serving to prevent transistor Q2 from turning off, which operation in turn serves to maintain transistor Q3 off. Under such a condition, which is representative of the situation which occurs when any station which is designated as an unrestricted station is off-hook and active at the time when the voltage potential is reversed on the T and R communication leads, the communication denying circuit is inhibited.

On the other hand, if only telephone stations (such as telephone station S1) which are designated as restricted stations are off-hook and active or if designated unrestricted stations are off-hook and inactive (in the hold mode), when base drive via diode CR8 is removed from transistor Q2, the ground which is extended over the A lead to terminal 101 does not, due to the fact that diode CR3 is back-biased, supply current to maintain transistor Q2 on. In such a situation, transistor Q2 turns off and transistor Q3 turns on, turning on relay D and denying the call in the manner discussed above.

Establishment of a Timed Interval for Monitoring the A Leads

As discussed, when transistor Q1 turns on, negative potential is extended to point 102 via capacitor C2. Capacitor C2, in conjunction with resistor R8, serves to establish an interval of approximately one-half second, during which timed interval point 102 goes from positive potential to negative potential (with respect to the negative supply voltage) supplied from the emitter of transistor Q1 and resistors R6 and R7. When capacitor C2 charges, the negative potential is removed from point 102, thereby allowing transistor Q2 to turn on from base drive supplied via resistor R8 and diode CR8. If call denying relay D had not operated during the established time interval, it could not operate thereafter even if transistor Q1 remains on for the duration of the call. In such a situation, even if unrestricted station S2 were to go on-hook, removing ground from terminal 100, relay D could not operate. Thus, the communication connection would continue to be established even though all of the telephone stations remaining on the connection are restricted stations connected to terminal 101 of call denial circuit 11. When all stations go on-hook, the connection is terminated under control of key telephone line circuit 10 and the CO or PBX switching machine.

Call Denying Operation

When relay D operates, contacts D-1 and D-2 open, thereby opening the T and R communication leads to the CO or PBX. This has the effect of causing the CO or PBX switching machine to drop the connection in a well-known manner. Operation of relay D also extends battery via enabled make contact D-3 to point 102 via capacitor C2 to maintain transistor Q2 off for approximately 1½ seconds as determined by the charging rate of capacitor C2 in conjunction with resistor R8. This timed interval is for the purpose of maintaining relay D operated for a time sufficient to drop the CO or PBX even though relay RV drops immediately upon the operation of relay D. At the expiration of this last timed interval, transistor Q2 turns on, turning transistor Q3 off and causing relay D to release. The circuit is thus restored to its initial state and is again available for controlling communication connections.

Conclusion

Although the inventive concept has been illustrated in a key telephone system having two stations, it is, of course, understood that any number of stations, either restricted or unrestricted, can be connected to the call denial circuit. Also, it should be understood that the A leads from the restricted stations need not be connected directly to the call denial circuit but instead may be connected directly to the key telephone line circuit. In situations where a key telephone line circuit is not utilized, the call denial circuit of the present invention can still be employed by connecting a lead, similar to the A lead, from the unrestricted station to the call denial circuit which lead would be arranged to supply an off-hook, active signal for control purposes.

What is claimed is:

1. A call denial circuit for use in a key telephone system wherein communication connections can be established between a telephone line and any number of telephone stations under control of a line circuit connected between said line and said stations, said line circuit being controllable by A lead signals from each said station, said call denial circuit arranged for connection to said telephone line and to the A lead of at least one of said stations and comprising
    means for monitoring said telephone line to detect voltage polarity reversals with respect to said telephone line,
    a first terminal connectable to the A lead from an associated station,
    means operable under control of said monitoring means for denying communication transmission over said telephone line when said voltage polarity reversal is detected, and
    means responsive to a first signal on said A lead when said A lead is connected to said first terminal for preventing the enabling of said denying means.

2. The invention set forth in claim 1 further comprising
    means responsive to a second signal on said A lead when said A lead is connected to said first terminal for rendering said preventing means inoperative.

3. The invention set forth in claim 2 wherein said call denial circuit further comprises
    a second terminal for connection to the A lead from an associated station, and
    means responsive to either said first signal or said second signal on said A lead when said A lead is connected to said second terminal for also rendering said preventing means inoperative.

4. The invention set forth in claim 3 wherein said first A lead signal is a signal representative of an off-hook active condition of the associated station and wherein said second A lead signal is a signal representative of an inactive condition of said associated station.

5. The invention set forth in claim 2 further comprising
    means for establishing a first timed interval after a detected voltage polarity reversal, and
    means for preventing the enabling of said denying means at the expiration of said first timed interval without regard to any said A lead signals.

6. The invention set forth in claim 5 further comprising
means for establishing a second timed interval, said second timed interval beginning upon the enabling of said denying means, and
means for maintaining said denying means operated for the duration of said second timed interval.

7. The invention set forth in claim 6 wherein said denying means includes a relay, the contacts of which are arranged to prevent communication over said line.

8. A call denial circuit for use in a key telephone system wherein communication connections can be established between a telephone line and any number of telephone stations under control of a line circuit connected between said line and said stations, said line circuit being controllable by A lead signals from each said station, wherein any number of said stations have an unrestricted calling capability said call denial circuit arranged for connection to said telephone line and to the A lead of each of said stations having an unrestricted calling capability and comprising
means for monitoring said telephone line to detect voltage polarity reversals with respect to said telephone line,
means for monitoring the A lead signals from said stations having an unrestricted calling capability,
means operable upon a detected voltage polarity reversal for denying communication transmission over said telephone line, and
means operable jointly upon a detected voltage polarity reversal and a detected off-hook active signal on any said A lead from any said station having an unrestricted calling capability for inhibiting the enabling of said denying means.

9. The invention set forth in claim 8 further comprising
means for establishing a first timed interval after a detected voltage polarity reversal, and
means for preventing the enabling of said denying means at the expiration of said first timed interval without regard to any said A lead signals.

10. The invention set forth in claim 9 further comprising
means for establishing a second timed interval, said second timed interval beginning upon the enabling of said denying means, and
means for maintaining said denying means operated for the duration of said second timed interval.

11. The invention set forth in claim 10 wherein said denying means includes a relay, the contacts of which are arranged to prevent communication over said line.

12. A call denial circuit for use in a telephone system where communication connections are established from a central switching machine to at least one telephone station over a communication pair of leads and where any said telephone station is arranged to provide, on a lead separate from said communication lead pair, a signal representative of an off-hook active condition, said call denial circuit comprising
means for monitoring said communication pair of leads to detect voltage polarity reversals with respect to said communication pair of leads,
means for monitoring said separate leads from any telephone station having unrestricted calling capability,
means operable upon a detected voltage polarity reversal for denying communication transmission over said communication pair of leads, and
means operable jointly upon a detected voltage polarity reversal and a detected off-hook active signal on any said monitored separate leads for inhibiting the enabling of said denying means.

13. The invention set forth in claim 12 further comprising
means for establishing a first timed interval after a detected voltage polarity reversal, and
means for preventing the enabling of said denying means at the expiration of said first timed interval without regard to any said monitored separate lead signals.

* * * * *